Patented Sept. 9, 1930

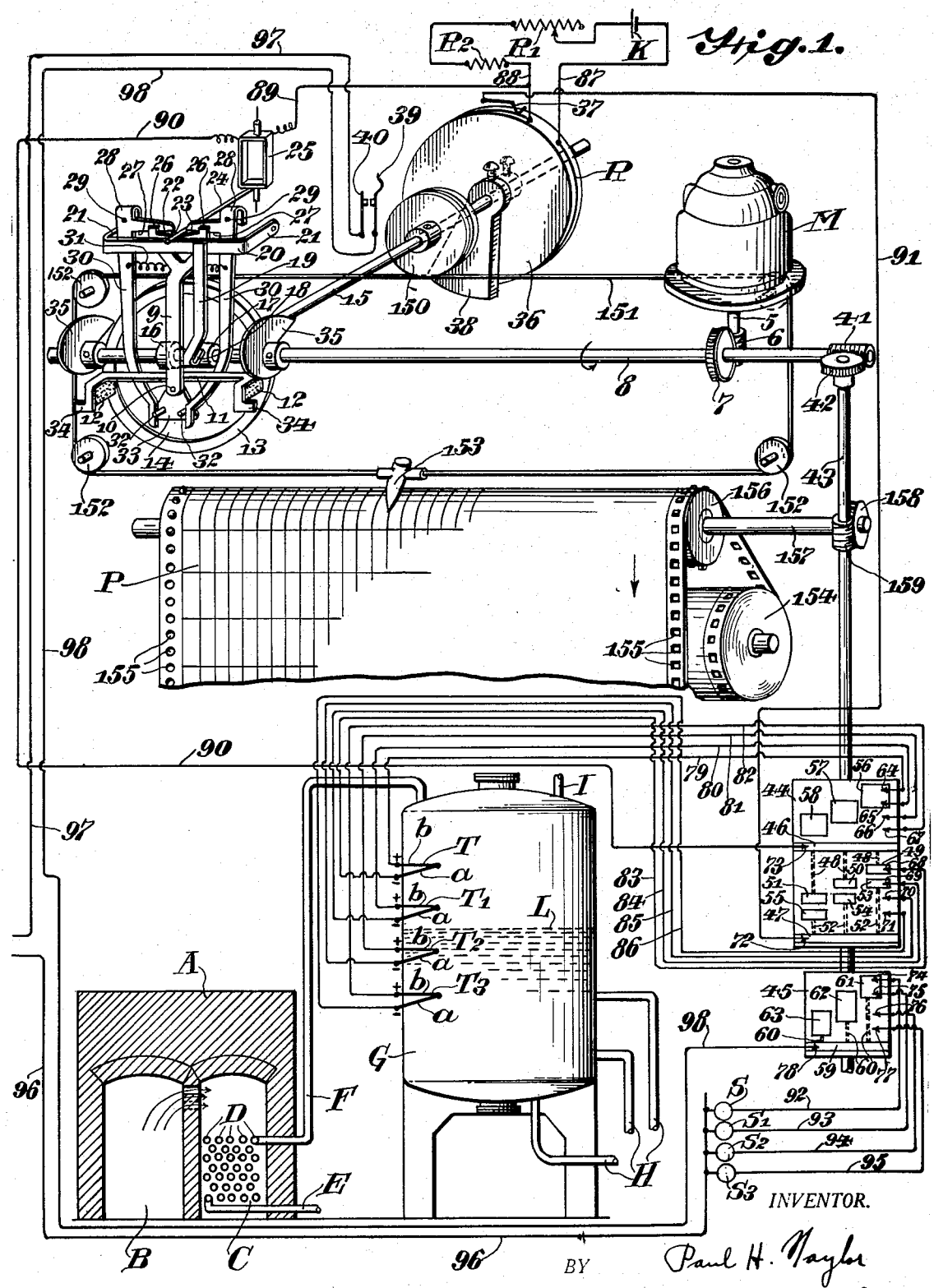

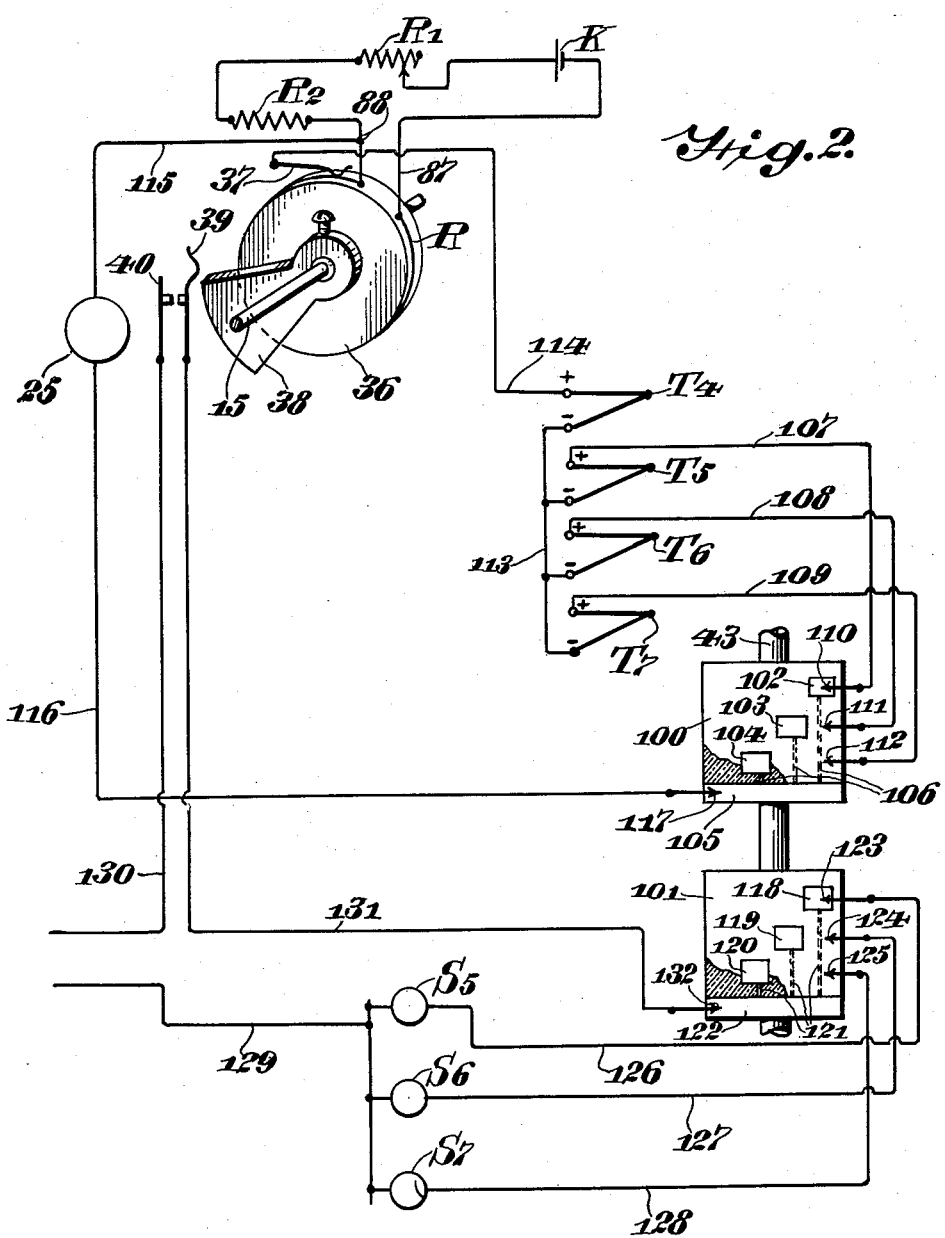
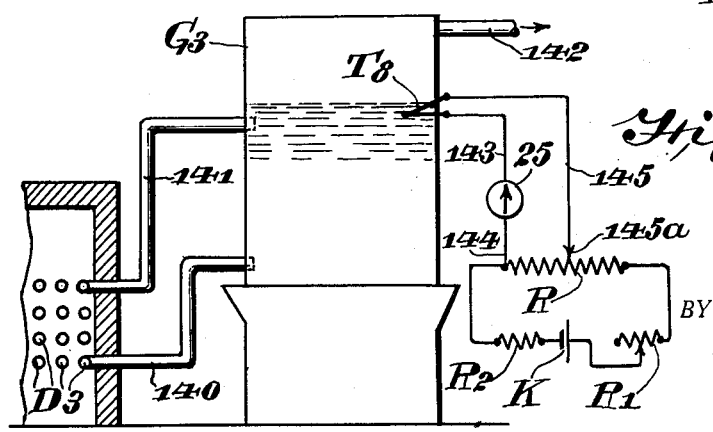

1,775,540

UNITED STATES PATENT OFFICE

PAUL H. TAYLOR, OF CHICAGO, ILLINOIS, ASSIGNOR TO LEEDS & NORTHRUP COMPANY, OF PHILADELPHIA, PENNSYLVANIA, A CORPORATION OF PENNSYLVANIA

CONTROL SYSTEM

Application filed June 18, 1926. Serial No. 116,883.

My invention relates particularly to a method of and apparatus for determining the level of the boundary between the liquid and vapor phases of a substance contained in a receptacle.

In accordance with my invention, the magnitude of an effect, as an electro-motive-force, is controlled in response to change of level of the aforesaid boundary and such change in magnitude of the effect is utilized in any desired manner, as for control, recording or signal purposes.

Further in accordance with my invention, there is associated with a receptacle containing a substance, as oil in liquid and vapor phases, a pair of devices dissimilarly spaced in a vertical relation and individually developing electromotive-forces proportional, respectively, to the temperatures of the oil in the different phases, and, should the level of the boundary between said several phases lie between said devices, the aforesaid electromotive-forces, when brought into opposition, are unequal and, accordingly, there results an electro-motive-force that may be utilized for any desired purpose, as for the actuation of a signal or the like.

Further in accordance with my invention, a plurality of devices individually generating electro-motive-forces proportional, respectively, to their temperatures are mounted on a receptacle containing oil in liquid and vapor phases in dissimilar spaced relation from the bottom thereof and pairs of the aforesaid devices are successively related to one another in such manner that their electro-motive-forces are opposed, whereby when the devices of a pair differ substantially in temperature, as determined by the liquid level lying therebetween, there is obtained a resultant electro-motive-force utilizable for effecting a control or actuating a signal or the like.

Further in accordance with my invention, upon attainment of predetermined height of the carbon deposit in a container wherein oil in liquid and vapor phases is treated, there is effected a control by a suitable temperature responsive device, and more particularly, an effect produced by the oil in one of said phases is modified upon attainment by the carbon deposit of a predetermined height.

My invention resides in the method, system and apparatus of the character hereinafter described and claimed.

For an understanding of my method and for an illustration of some of the forms my invention may take, reference is to be had to the accompanying drawings in which:

Fig. 1 is a diagrammatic view of apparatus constructed in accordance with my invention.

Figs. 2 and 3 are diagrammatic views illustrating modified forms of my invention.

In some forms of liquid heating or treating systems, as those utilizable for cracking oil, distilling coal, alcohol, acid or the like, generating steam, etc., liquid is passed, either continuously or non-continuously, to a chamber or receptacle wherein the liquid, or a portion thereof, is changed or evolved into vapor form. Usually concurrently with passage of the liquid to the treating chamber, the vapors or liquid, or both, are suitably withdrawn, either continuously or non-continuously, with resultant shifting or change of the level of the liquid within the aforesaid chamber. In accordance with my invention such change or height of the liquid level is suitably indicated, recorded, or utilized in effecting a control.

My invention finds particular application in connection with an oil treating system wherein liquid oil is charged to a cracking still where vapors are evolved which are thereafter passed from the still. A well-known cracking system of this character is diagrammatically illustrated in Fig. 1 as comprising the furnace or heating structure A having a combustion chamber B and a tube chamber C, the hot gaseous products of combustion passing in the direction of the arrows into contact with the tube coil or bank D into which oil is introduced through the line E, preferably continuously and at a uniform rate. While traversing the tube coil D the oil is heated to the critical or cracking temperature and then is discharged through the transfer line F to the reaction chamber G. The cracking is completed within chamber G without additional heat, the oil separating into residuum or fuel oil, and vapors, while the carbon liberated by the cracking is deposited on the walls of the chamber and forms coke. The residuum is withdrawn from reaction chamber G through lines H and is usually passed to a cooler, not shown. The vapors from the reaction chamber pass by way of line I to a dephlegmator or other column, not shown, where they are cooled.

In the reaction chamber G, the level L of the oil undergoes considerable fluctuation and it is highly desirable that the attendant or operator be reliably informed concerning any change in the height of such level. In accordance with my invention, changes in the oil level, as aforesaid, are indicated by utilizing a plurality of temperature responsive devices T, $T^1$, $T^2$ and $T^3$ herein shown as thermo-couples of a type well-known in the art, each comprising dissimilar metals as the wires $a$ and $b$. In the example illustrated, the thermo-couples, in spaced vertical relation and preferably in a vertical row, are mounted interiorly of chamber G, the wires $a$ and $b$ passing exteriorly through suitable holes or perforations in the wall of said chamber.

In a reaction chamber of the character described, it has been demonstrated that there is a substantial temperature difference between the vapors and the liquid oil, usually from thirty to fifty degrees Fahrenheit, the vapor showing the higher temperature reading, although the liquid at the immediate surface may have a somewhat higher temperature than the lower body of liquid. It has also been demonstrated that the temperature of a thermo-couple in the vapor zone is influenced by the rising liquid level to such extent that its temperature decreases substantially fifteen degrees F. when the liquid level approaches to within approximately one foot thereof.

In view of the foregoing, it becomes apparent that the approximate height of the liquid oil level in the reaction chamber may be determined by ascertaining the temperatures of the various thermo-couples. For example, in Fig. 1 the thermo-couples T and $T^1$ would exhibit substantially higher temperatures than the thermo-couples $T^2$ and $T^3$ and, therefore, the liquid level would properly be assumed as lying therebetween. Further, if the temperature of thermo-couple $T^1$ were approximately fifteen degrees lower than the temperature of thermo-couple T, although substantially higher than the temperature of thermo-couples $T^2$ and $T^3$, the liquid level would correctly be assumed as lying within substantially one foot of thermo-couple $T^1$.

The thermo-couple temperature or the temperature differences between the various thermo-couples may be ascertained in any suitable manner, for example, by the utilization of indicating or recording pyrometers. Or, and preferably, there may be provided a suitable signal system to be actuated by suitable control apparatus, for example, of the character disclosed in U. S. patent to Leeds No. 1,332,182.

As herein shown, such control apparatus comprises a suitable motor, as the electric motor M, which rotates the shaft 5, preferably at substantially constant speed, which in turn drives the worm 6 which meshes with and drives the worm gear 7 secured upon the shaft 8 having suitable bearings on a frame, not shown. To the back of a lever 9, pivoted to the aforesaid frame, is secured a bracket, not shown, and between the bracket and member 9 and carried by them is a pivot 10, on which the arm 11 is pivotally mounted. On each end of the arm 11 is a shoe 12, of cork or equivalent material, frictionally engaging the rim 13 of the clutch disk or wheel 14 secured upon a shaft 15 having a suitable bearing, not shown. Secured upon the shaft 8 is a cam 16, which periodically engages the lever or member 9 and moves it outwardly in opposition to a spring, not shown, thereby lifting the shoes 12 free from the rim 13 of the wheel 14, the aforesaid spring returning the shoes 12 into engagement with the rim 13 after predetermined rotation of cam 16. Upon the shaft 8 is secured a second cam 17 which, immediately after the cam 16 has caused the lifting of shoes 12 from rim 13, engages the end of finger 18, on the lower end of arm 19, which is secured at its upper end to the member 20, whose arms 21 are pivoted to the aforesaid frame. Upon the frame or member 20 is secured the member 22, whose upper edge 23 is inclined and increases in height from the center outwardly. Disposed immediately above the edge 23 is the needle or pointer 24 of any suitable measuring or indicating instrument, as, for example, a galvanometer having the movable coil 25, which actuates or deflects the attached pointer or needle 24. At opposite ends of the member 22 are the abutments 26 for limiting deflection or swing of the needle 24. Directly above the needle 24 and beneath which it normally freely swings are the edges 27, preferably straight horizontal edges, upon the members 28 pivoted at 29 to a bracket, not shown, mounted on the aforesaid frame. The members 28 extend toward each other, leaving a gap of sufficient width between their ends to allow free entry of the needle 24 when the same is in balanced, zero or mid position, the needle 24 normally swinging freely between the edge 23 of member 22 and the lower edges of the member 28. The members 28 have the downwardly extending arms 30 drawn toward each other by the spring 31. Associated with the lower ends of arms 30 are the pins 32, 32 upon the triangular member 33 operatively secured to the member 11.

At each end of the arm or member 11 are the metal ears or projections 34, adapted to be engaged by the cams 35, similar in shape and similarly positioned and secured upon the shaft 8.

Secured upon the shaft 15 is a disk or wheel 36, of wood or other insulating material, carrying upon its periphery the resistance conductor R, which may be in the form of a helix. A stationary contact 37 is suitably biased into engagement with the resistance R. Secured upon the shaft 15 is an arm or member 38 utilizable for moving a movable switch contact 39 into engagement with a fixed switch contact 40, as hereinafter more fully described.

Carried by the shaft 8 is a worm gear 41 meshing with and driving the gear 42 secured to a shaft 43 upon which are mounted the commutators or cylinders 44 and 45 formed of suitable insulating material. Due to the ratio of gears 41 and 42 shaft 43 rotates at a much slower rate than does the shaft 8.

Lying flush with the surface of cylinder 44 are the spaced conducting rings or segments 46 and 47, the former being connected by suitable conductors 48 with the series of stepped conductive segments 49, 50 and 51, and the latter being connected by similar conductors 52 with a second series of stepped conductive segments 53, 54 and 55. Likewise carried by the commutator 44 is a third series of stepped conductive segments 56, 57 and 58 preferably of somewhat greater width than are the segments 49, 53, etc.

Cylinder 45 comprises the conductive ring or segment 59 to which by conductors 60 are connected the conductive segments 61, 62 and 63.

It shall be understood that all the aforesaid conductive rings and segments lie flush with the surface of the respective cylinders 44 and 45, thereby presenting smooth and unbroken surfaces to the contact elements coacting therewith.

Riding upon the surface of commutator 44 are the stationary contact elements 64, 65, 66, 67, 68, 69, 70, 71, 72 and 73. Riding upon the surface of commutator 45 are the similar stationary contact elements 74, 75, 76, 77 and 78.

During rotation of commutators 44 and 45 in a direction from left to right, Fig. 1, contacts 73, 72 and 78 continuously engage their respective conductive rings 46, 47 and 78. When said commutators are in the position indicated, contacts 64 and 65 are in engagement with segment 56, contacts 68 and 69 are, respectively, in engagement with the segments 49 and 53 and contacts 74 and 75 are in engagement with the segment 61.

During another period in the rotation of the commutators, contacts 65 and 66 are in engagement with segment 57, contacts 69 and 70 are, respectively, engaged with segments 50 and 54, and contacts 75 and 76 are engaged with segment 62.

During still another period in the rotation of the commutators, contacts 66 and 67 are in engagement with segment 58, contacts 70 and 71 are, respectively, engaged with segments 51 and 55, and contacts 76 and 77 are engaged with segment 63.

In the form of my invention illustrated in Fig. 1, thermo-couple T is differentially compared with thermo-couple $T^1$, thereafter thermo-couples $T^1$ and $T^2$ are differentially compared, and finally thermo-couples $T^2$ and $T^3$ are similarly compared. To this end, the ends of wires $b$, constituting the positive terminals of the various thermo-couples, are connected, respectively, by conductors 79, 80, 81 and 82 to the contact elements 64, 65, 66 and 67 and the ends of wires $a$, constituting the negative terminals of the various thermo-couples, are connected, respectively, by conductors 83, 84, 85 and 86 to the contact elements 68, 69, 70 and 71.

In the example herein illustrated the galvanometer coil 25 cooperates with a potentiometer circuit as in said prior Letters Patent 1,332,182. It will be understood, however, that the coil 25 may be used in association with any other suitable circuit arrangement adapted to the apparatus and system herein described, or to any equivalent control apparatus or system.

In the present instance, the potentiometer resistance R is connected in series with the battery or other suitable source of current K, the adjustable resistance $R^1$ and the resistance $R^2$ by the conductors 87 and 88. Branching from the conductor 88 is a conductor 89 connected to one terminal of galvanometer coil 25 whose other terminal is connected by a conductor 90 to contact 73. Connected to the fixed contact 37, which, as stated above, coacts with resistance R, is the conductor 91 leading to the fixed contact 72.

In the example illustrated, the signaling system comprises a plurality of incandescent electric lamps S, $S^1$, $S^2$ and $S^3$ corresponding with the number of thermo-couples utilized and controlled by commutator 45. To this end, conductors 92, 93, 94 and 95, respectively, connect the fixed contact elements 74, 75, 76 and 77 to one terminal of each of the lamps S, $S^1$, $S^2$ and $S^3$ whose other terminals are connected to a common conductor 96 leading to one terminal of a suitable source of current, not shown, from the other terminal of which leads a conductor 97 to the fixed contact 40. Leading from the movable contact 39 is a conductor 98 connected to the fixed contact 78 which, as stated above, coacts with ring 59 of commutator 45.

The operation is as follows:

The control apparatus motor M operates to slowly and constantly rotate shaft 43, thereby bringing the various conductive segments on the commutators 44 and 45 successively into engagement with the fixed contact elements, the rings 46, 47 and 59 meanwhile constantly engaging the fixed contacts 73, 72 and 78.

For a given position of the parts, for example, as illustrated in Fig. 1, a circuit may be traced from the positive terminal of thermo-couple T along conductor 79 to contact 64, conductive segment 56, contact 65, conductor 80 to the positive terminal of thermo-couple $T^1$, through the wires $b$ and $a$ thereof, thence along conductor 84 to contact 69, segment 53, a conductor 52 to contact ring 47, and thence to resistance R by way of conductor 91 and contact 37. From resistance R this circuit is extended by conductors 88 and 89 to one terminal of the galvanometer coil 25, thence through said coil to conductor 90 and contact 73, conductive ring 46, a conductor 48 to segment 49, contact 68 and conductor 83 to the negative terminal of thermo-couple T, thence through the wires $a$ and $b$ thereof back to its positive terminal.

In this circuit, thermo-couples T and $T^1$ are connected in opposition, and hence their electro-motive-forces oppose each other. Therefore, if both are immersed in the same medium, that is, either the vapors or liquid oil, the temperature of each will be the same, the resultant electro-motive-force will be zero, and the control apparatus disk 36 and resistance R will be in the position indicated in Fig. 1.

Suppose, however, that the level L of the liquid rises an amount sufficient to just cover thermo-couple $T^1$. As stated above, the temperature of this thermo-couple will fall some 30 to 50 degrees below the temperature of thermo-couple T, which, accordingly, generates an electro-motive-force proportionately less than thermo-couple T. In such case, a current will flow through the galvanometer coil 39, and the needle 24 will be deflected toward the left, Fig. 1. The needle 24 being deflected to a position between edge 23 of member 22 and the lower edge 27 of the left hand member 28, the cam 16, driven by the constantly rotating shaft 8, will first tilt the member 9 and lift the shoes 12 from the rim 13 of the wheel 14; immediately thereafter, and while the shoes 12 are still raised from rim 13, the cam 17 will raise the frame 20 and the attached member 22 and clamp the now deflected needle 24 between the edge 23 and the lower edge 27 of the left hand member 28, causing the member 28 to rise and rotate about its pivot 29, causing the lower end of the left hand arm 30 to force the left hand pin 32 toward the right, thereby tilting the arm 11 in a counterclockwise direction through an angle whose extent is dependent upon or proportional to the extent of deflection of the needle 24. After the cam 17 has released the frame 20, the cam 16 will allow the member 9 to return under the influence of the spring, not shown, to its normal position and bring the shoes 12 into engagement with the rim 13 of the wheel 14 in the angular position to which the arm 11 has been moved. Thereafter, the right hand cam 35 will engage the contact ear 34 on the arm 11 and rotate it and wheel 14 and the shaft 15 clockwise to position where arm 11 is again in normal position.

Clockwise rotation of shaft 15 effects similar rotation of disk 36 to move resistance R with respect to contact 37 to such position that the fall of potential between said contact and the end of resistance R to which conductor 89 is connected is equal and opposite to the electro-motive-force produced by the thermo-couple T. It may be that the first movement of disk 36 does not move the resistance to such a position with respect to contact 37 as to produce a balance. However, succeeding revolutions of shaft 8 will finally produce a balance and when attained, the needle 24, when raised by the edges 23, passes freely into the gap between the horizontal arms of members 28 without affecting either arm.

Arm 38 is so positioned on shaft 15 that when balance is attained as aforesaid, the end thereof has moved the movable switch element 39 into engagement with fixed switch element 40. As a result, since contacts 74 and 75 are in engagement with segment 61, the circuit through lamps S and $S^1$ is closed and the resultant bright condition thereof is indicative of the fact that the liquid level in chamber G is somewhere between thermo-couples T and $T^2$.

Obviously, should the liquid descend to a level between thermo-couples $T^1$ and $T^2$, the control apparatus functioning as above described would effect illumination of lamps $S^1$ and $S^2$ thereby indicating the height of such level.

It is characteristic, therefore, of the form of my invention illustrated in Fig. 1 that illumination of a pair of lights establishes the fact that the liquid level is between the pair of thermo-couples controlling such lights.

In Fig. 2 there is diagrammatically illustrated a form of my invention wherein the thermo-couples $T^4$, $T^5$, $T^6$ and $T^7$ are arranged at different heights, preferably in a vertical row on the wall of a liquid-containing chamber which may correspond with the reaction chamber of Fig. 1. In accordance with this form of my invention, thermo-couple $T^4$ is positioned at such height as to always be above the liquid level.

Carried by the shaft 43 of the control apparatus are the cylinders or drums 100 and 101 formed of suitable insulating material.

Lying flush with the surface of cylinder 100 are the conductive segments 102, 103, 104 and the conductive ring 105, each segment being connected to ring 105 by a conductor 106.

Leading from one terminal of thermo-couples $T^5$, $T^6$ and $T^7$, for example, the positive terminal, are the respective conductors 107, 108 and 109 terminating in the fixed contacts 110, 111 and 112 which coact, respectively, with the segments 102, 103 and 104. The negative terminals of all the thermo-couples are connected to the common conductor 113. A conductor 114 leads from the positive terminal of thermo-couple $T^4$ to the fixed contact 37 coacting with the resistance R. Branching from the conductor 88 is a conductor 115 connected to one terminal of the galvanometer coil 25 whose other terminal is connected by a conductor 116 with the fixed contact 117 coacting with the conductive ring 105.

The cylinder 101 comprises the three conductive segments 118, 119, 120, each connected by a conductor 121 to the conductive ring 122.

Coacting, respectively, with the segments 118, 119 and 120 are the fixed contacts 123, 124 and 125, connected, respectively, by conductors 126, 127 and 128 to one set of terminals of the signaling lamps $S^5$, $S^6$ and $S^7$ whose other terminals are connected to a common conductor 129 leading to one terminal of a suitable source of current, not shown, whose other terminal is connected by a conductor 130 with the fixed contact 40. Leading from the movable contact 39 is a conductor 131 connected to a fixed contact 132 coacting with conductive ring 122 of commutator 101.

In accordance with the form of my invention illustrated in Fig. 2, thermo-couples $T^5$, $T^6$ and $T^7$ are individually and successively connected in opposition to thermo-couple $T^4$. Since thermo-couple $T^4$ is always immersed in the vapors, if the particular thermo-couple being compared therewith is likewise immersed in said vapors, the temperatures of both thermo-couples will be the same, their electro-motive-forces will oppose each other and the galvanometer needle of the control apparatus will simply move up or down and will not be deflected.

Suppose, however, that with the commutators positioned as indicated in Fig. 2, the liquid level in the chamber has reached a height where the thermo-couple $T^5$ is just immersed therein. The temperature of this thermo-couple will fall, thereby lowering its developed electro-motive-force, that of thermo-couple $T^4$ being proportionately greater. In such case, a current will flow through the galvanometer coil 25 causing deflection thereof and its attached needle, which, in the manner described above with respect to Fig. 1, operates to rotate shaft 15 and its arm 38 to such position that switch elements 39 and 40 are closed to complete a circuit through lamp $S^5$ to indicate the fact that the liquid level is above thermo-couple $T^5$.

With thermo-couple $T^5$ immersed in the liquid, thermo-couples $T^6$ and $T^7$ would likewise be immersed and, accordingly, for continued rotation of shaft 43, the lamps $S^6$ and $S^7$ in turn would likewise become luminous. However, when the liquid level drops below thermo-couple $T^5$ or $T^6$, there is resultant lighting of the two lamps $S^6$ and $S^7$ or lamp $S^7$ alone as the case may be, thereby indicating to an observer the approximate height of the liquid level.

In Fig. 3, there is diagrammatically illustrated another form of my invention wherein liquid oil is heated in the cracking coil $D^3$ by the gaseous products of combustion passing through a combustion chamber, not shown, and circulates to and from the pressure still $G^3$ by way of lines 140 and 141, vapors passing from said still through the line 142 to a suitable destination.

In accordance with this form of my invention, a temperature-responsive device, as the thermo-couple $T^8$, is mounted on still $G^3$, preferably in a region somewhat below the normal liquid level, which, as well-understood in the art, should be maintained at such height as to cover the entrance to line 141. Upon fall of the liquid level below thermo-couple $T^8$, its temperature rises, and the change of temperature thus effected may be utilized in any suitable manner, as for effecting a control, drawing a curve or actuating a signal. In the example shown, one terminal of said thermo-couple is connected by the conductor 143 to one terminal of the galvanometer coil 25, which may be a part of control apparatus similar to that illustrated in Fig. 1, and whose other terminal is connected by a conductor 144 to one end of the resistance R. Branching from the other terminal of said thermo-couple is a conductor 145 terminating in the contact 145$^a$ adjustable along the resistance R. Assuming that thermo-couple $T^8$ is immersed in the liquid oil, the contact 145$^a$ will have been adjusted along the resistance R to such position that the fall of potential between said contact and the left end of the resistance R is equal and opposite to the electro-motive-force produced by the thermo-couple, in which case the deflection of the galvanometer 25 is zero. However, should the liquid level fall sufficiently to envelop thermo-couple $T^8$ in the vapors, its temperature rises, assuming substantially constant temperature of the liquid, thereby generating a proportionately higher electro-motive-force, with resultant unbalancing of the control apparatus, the needle of the galvanometer 25 being deflected to rotate the shaft supporting resistance R until balance is again attained, at which time the fall of potential between the contact 145$^a$ and the left end of the resistance R is equal and opposite to the electro-motive-force produced by thermo-couple $T^8$.

As stated above, operation of the control apparatus as just described may be utilized for any desired purpose. For example, the shaft corresponding with shaft 15 of Figs. 1 and 2 and on which is mounted a disk supporting the resistance R may carry an arm corresponding with arm 38 so positioned that upon envelopment of thermo-couple $T^8$ by the vapors, such arm is moved to position closing the actuating circuit of a suitable signal, as an incandescent lamp. It follows, therefore, that a single lamp may be utilized in connection with the apparatus disclosed in Fig. 3, and when thermo-couple $T^8$ is positioned as illustrated, the unlighted condition of the lamp is indicative of the fact that the liquid level in the reaction chamber $G^3$ is sufficiently high. However, should such lamp become illuminated, the operator is at once advised that the liquid has fallen below the danger level and corrective measures may be at once instituted.

My invention may also be practiced in connection with recording apparatus of the character disclosed in U. S. patent to Leeds No. 1,125,699, granted January 19, 1915, wherein there is disclosed an arrangement for obtaining individual curves for each of a plurality of thermo-couples varying in temperature. Obviously, any suitable number of the thermo-couples disclosed in that patent may be mounted at different heights on the wall of the liquid-containing chamber and utilized for successively and individually actuating the control apparatus to obtain individual curves showing their temperatures. Upon inspection of the record sheet, two of the successively drawn curves will indicate that their respective controlling thermo-couples differ in temperature from 30 to 50 degrees more or less, and then by locating such thermo-couples on the wall of the chamber, it becomes definitely known that the liquid level lies therebetween.

Obviously, the systems disclosed in Figs. 1 and 2 may be utilized for forming graphic records of the resultant temperature of each opposed pair of thermo-couples. To this end, and as indicated in Fig. 1, the shaft 15 may have secured thereto the grooved pulley or wheel 150 of any suitable diameter around which passes the cord 151 which passes over suitable pulleys 152 and is secured to the marker or recorder pen 153, movable transversely, on guides, not shown, with respect to the recorder paper P stored upon a roll or spool 154, and having the marginal perforations 155, engaging teeth or pins upon the periphery of the roller 156, secured upon the shaft 157 which is driven by the motor M from shaft 43 through the gear 158 meshing with worm 159.

As is well understood in the art, the apparatus controlled by the galvanometer needle 24 moves the recorder marker 153 transversely to the direction of motion of the recorder paper P, which is indicated by the arrow and, accordingly, there is printed a succession of characters for different pairs of the thermo-couples through which lines may be drawn to obtain records of the resultant temperatures of the thermo-couple pairs.

Ordinarily, the thermo-couples should be mounted interiorly of the reaction chamber and enclosed by sleeves, tubes or the like of suitable material, as steel. Should a substantial amount of carbon become deposited on such sleeves or tubes, it may be necessary to remove the same, but unless quite thick, the error in temperature measurement does not become sufficiently high to prevent the proper operation of the apparatus. In case a substantial amount of carbon does become deposited on some of the thermo-couples, the temperature thereof will be much lower than when they are immersed directly in the enveloping medium. This is due to the fact that carbon is a relatively poor conductor of heat. Therefore, after a period of operation the approximate height of the carbon deposit may be readily determined by observing the temperature of one or more of the lower thermo-couples, which temperature may be compared with the temperature of a thermo-couple around which carbon could not have been deposited. That is, if the difference in temperature between two thermo-couples immersed respectively in the oil vapor and liquid appreciably exceeds the range of 30° to 50° F., previously referred to, it follows that the thermo-couple in the liquid has acquired an appreciable deposit of carbon thereon. In the same manner, an appreciable difference in indicated temperatures between a pair of thermo-couples which are both immersed in the oil would likewise indicate that the lower thermo-couple had acquired considerable deposit of carbon thereon. Another method for determining the height of carbon deposit is illustrated in Fig. 2, in which the upper thermo-couple $T^4$ is successively connected in opposition to the other couples $T^5$, $T^6$ and $T^7$. If the oil level should be determined as between couples $T^4$ and $T^5$, and if the indicated temperature difference between $T^4$ and $T^6$ should be appreciably greater than that between $T^4$ and $T^5$, it would follow that carbon deposit had reached a height somewhere between couples $T^6$ and $T^5$.

When signal lamps or other visual signals are utilized, it is preferable that they be placed in a vertical row on the chamber wall each at a height corresponding with the height of the controlling thermo-couple. For example, in Fig. 2, it is desirable that thermo-couple $T^5$ and lamp $S^5$ correspond in height, and that there be similar correspondence between thermo-couple $T^6$ and lamp $S^6$, and between thermo-couple T⁷ and lamp S⁷. As hereinbefore indicated, other types of signals may be utilized, as horns, bells, klaxons or the like. Signals of the character last mentioned are particularly desirable when but two thermo-couples are utilized, one in the permanent vapor space and one at the danger level, in which case actuation of an alarm would inform the attendant of the existing dangerous condition.

It shall be understood that the temperature-responsive devices or thermo-couples may be suitably secured to the wall or walls of the liquid-containing chamber, as in holes drilled therein, or they may be welded or peened to said wall or walls, as when the interior of the chamber is subjected to very high pressure. Further, it shall be understood that such devices or thermo-couples may be secured to the chamber wall exteriorly thereof, in which case they are influenced by heat transmitted therethrough. Also, when a greater degree of sensitivity is desired, multiple thermo-couples may be employed.

It will be observed that arm 38 is adjustable circumferentially of shaft 15, and, therefore, it is possible to change or shift the range at which actuation of the signal devices will occur.

What I claim is:

1. The combination with a receptacle containing oil in liquid and vapor phases, of a plurality of devices individually generating electro-motive-forces proportional, respectively, to the temperatures of the oil in said several phases, means for deriving a resultant electro-motive-force by opposing said first named electro-motive-forces when the liquid level lies between said devices, means for periodically opposing said electro-motive-forces, control mechanism, means for operating said control mechanism by said resultant electro-motive-force, and a signal actuated by said control mechanism.

2. The combination with a receptacle containing oil in liquid and vapor phases, of a plurality of devices dissimilarly spaced from the bottom of said chamber and individually generating electro-motive-forces proportional, respectively, to the temperatures of the oil in said several phases, means for successively opposing the electro-motive-forces of pairs of said devices whereby there is obtained a resultant electro-motive-force from the pair of said devices between which said liquid level lies, control mechanism, and means for operating said control mechanism by the resultant electro-motive-force.

3. The combination with a receptacle containing oil in liquid and vapor phases, of a plurality of devices mounted on said chamber and dissimilarly spaced from the bottom of said chamber and individually generating electro-motive-forces proportional, respectively, to the temperatures of the oil in said several phases, means for successively opposing the electro-motive-forces of pairs of said devices whereby there is derived a resultant electro-motive-force from the pair of devices between which the liquid level lies, a signal for each of said devices, and means for operating the pair of signals corresponding with the pair of said devices from which said resultant electro-motive-force is derived.

4. The combination with a receptacle containing a substance in liquid and vapor phases, of thermo-responsive means disposed in each of said phases, means for differentially comparing the electro-motive-forces produced by said thermo-responsive means, electric balancing circuit comprising a galvanometer affected by the resultant electro-motive-force control mechanism actuated by said galvanometer in response to such difference, and a signal actuated by said control mechanism upon predetermined difference in magnitude between said effects whereby change in boundary between said liquid and vapor phases is indicated.

5. The combination with a receptacle containing a substance in liquid and vapor phases, of a plurality of thermo-couples disposed in both phases, means for successively opposing the electro-motive-forces of pairs of said thermo-couples whereby there is obtained a resultant electro-motive-force from the pair of said devices between which said liquid level lies, control mechanism actuated to an extent dependent on the magnitude of said resultant electro-motive-force, and a signal for each of said pairs of thermo-couples actuated by said control mechanism when the resultant electro-motive-force produced thereby reaches a predetermined value.

6. The combination with a receptacle subject to a deposit of carbon from oil contained therein in liquid and vapor phases, of thermo-responsive means spaced unequal distances from the bottom of said receptacle and subject to deposition of carbon thereon, means for differentially comparing the effects produced by each of a pair of said thermo-responsive means, control mechanism actuated in accordance with such difference, and a signal actuated by said control mechanism upon predetermined magnitude of said difference.

7. The method of determining the height of the carbon deposit in a container wherein oil in liquid and vapor phases is treated, which comprises differentially comparing thermo-electro-motive-forces representative of the temperatures of points spaced vertically along the side wall of said container and utilizing the resultant electro-motive-force to actuate a signal in accordance with a predetermined temperature difference between said points.

8. The method of determining both the level of the boundary between oil in liquid and vapor phases in a container and the height of carbon precipitated by said oil, which comprises producing electro-motive-forces in accordance with the temperatures at a plurality of points spaced vertically along the side walls of said container, and opposing the electro-motive-forces representative of the temperatures of a single pair of points to determine both the level of said boundary and said carbon deposit.

9. The combination with a still containing oil in liquid and vapor phases, of means responsive to change of level of the boundary between said phases comprising a plurality of thermo-couples responsive to the temperatures of the oil in said phases and spaced unequal vertical distances from the bottom of the still, means for successively connecting said thermo-couples in pairs whereby their electro-motive-forces are opposed, control mechanism, and means operating said control mechanism by a resultant electro-motive-force of predetermined magnitude when a pair of thermo-couples are so opposed.

PAUL H. TAYLOR.